United States Patent [19]

Bryer

[11] Patent Number: 5,204,792
[45] Date of Patent: Apr. 20, 1993

[54] CARTRIDGE TAPE DRIVE

[75] Inventor: Philip Bryer, Los Angeles, Calif.

[73] Assignee: Wangtek, Inc., Simi Valley, Calif.

[21] Appl. No.: 851,718

[22] Filed: Mar. 16, 1992

Related U.S. Application Data

[62] Division of Ser. No. 433,700, Nov. 9, 1989, abandoned.

[51] Int. Cl.$^5$ ............................................. G11B 5/008
[52] U.S. Cl. ..................................... 360/96.5; 360/93
[58] Field of Search ................... 360/93, 96.1, 96.5,
360/96.6, 105, 106; 242/192, 197–200

[56] References Cited

U.S. PATENT DOCUMENTS

| 3,604,862 | 9/1971 | Ban | 360/134 |
| 4,755,900 | 7/1988 | Zarr | 360/96.5 |
| 4,796,120 | 1/1989 | Komatsu et al. | 360/96.5 |

FOREIGN PATENT DOCUMENTS

| 0170434 | 2/1986 | European Pat. Off. |
| 0241238 | 10/1987 | European Pat. Off. |
| 0394581 | 10/1990 | European Pat. Off. |
| 3721798A1 | 1/1988 | Fed. Rep. of Germany |

Primary Examiner—Stuart S. Levy
Assistant Examiner—Jefferson Evans
Attorney, Agent, or Firm—Robbins, Dalgarn, Berliner & Carson

[57] ABSTRACT

A cartridge tape drive having a housing with an opening dimensioned to allow endwise insertion of a rectangular cartridge with an access door along a side edge thereof. The cartridge is supported on a stationary support within the housing. The cartridge tape drive is provided with a mechanism which opens the access door, and a mechanism which moves the cartridge laterally within the housing into operative engagement with a magnetic head. The magnetic head is attached to the stationary support.

18 Claims, 13 Drawing Sheets

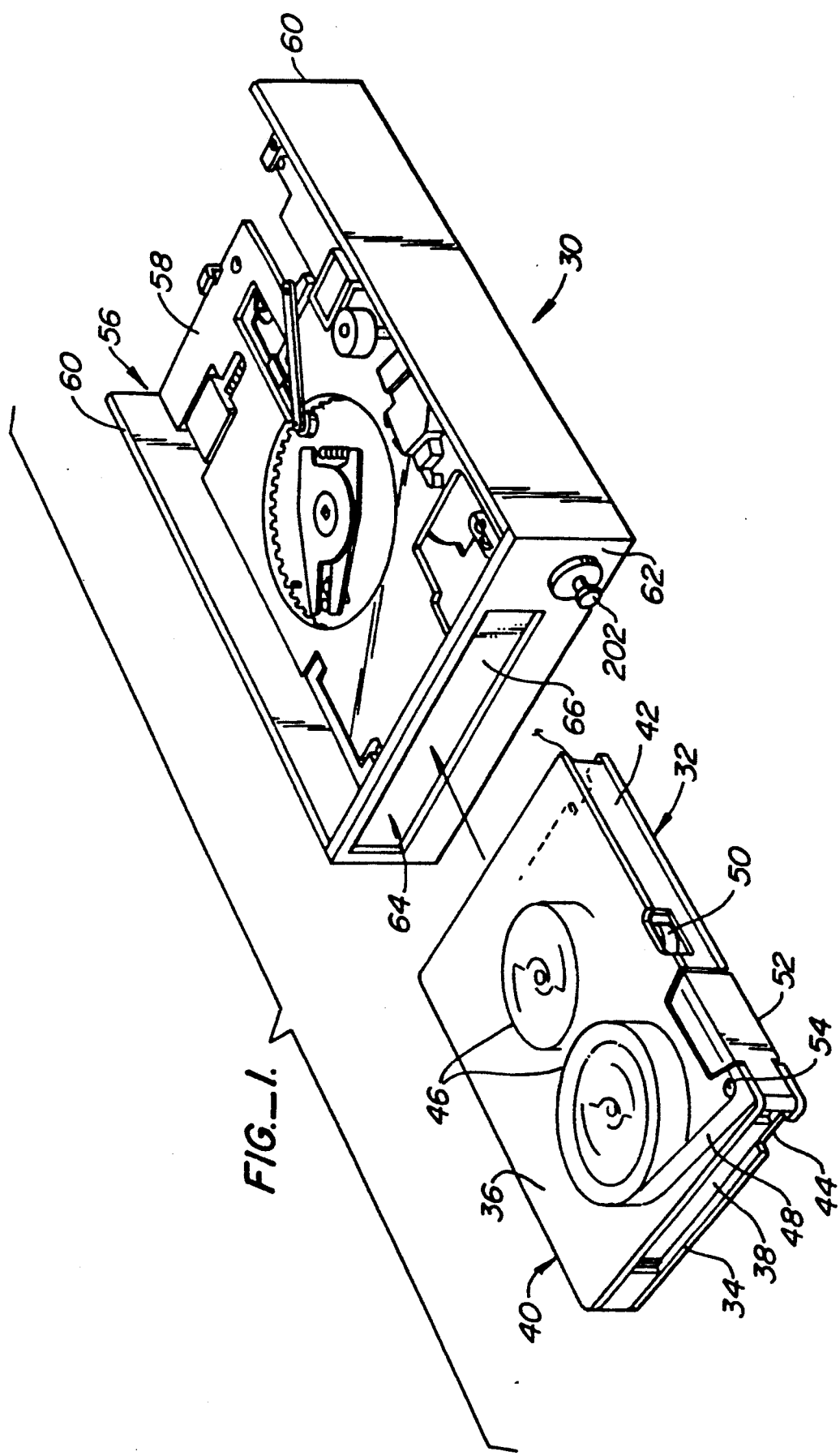
FIG._1.

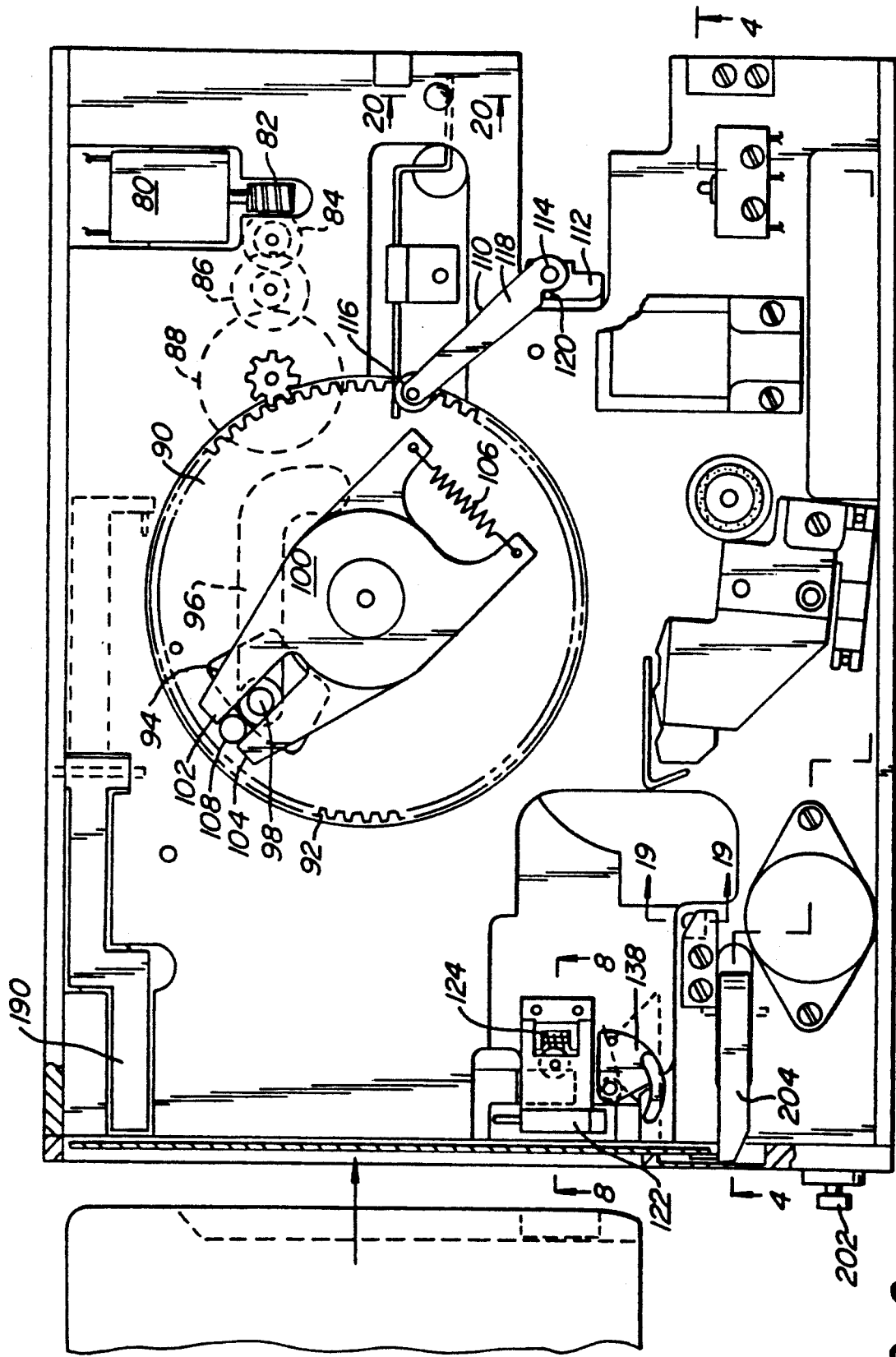
FIG._2.

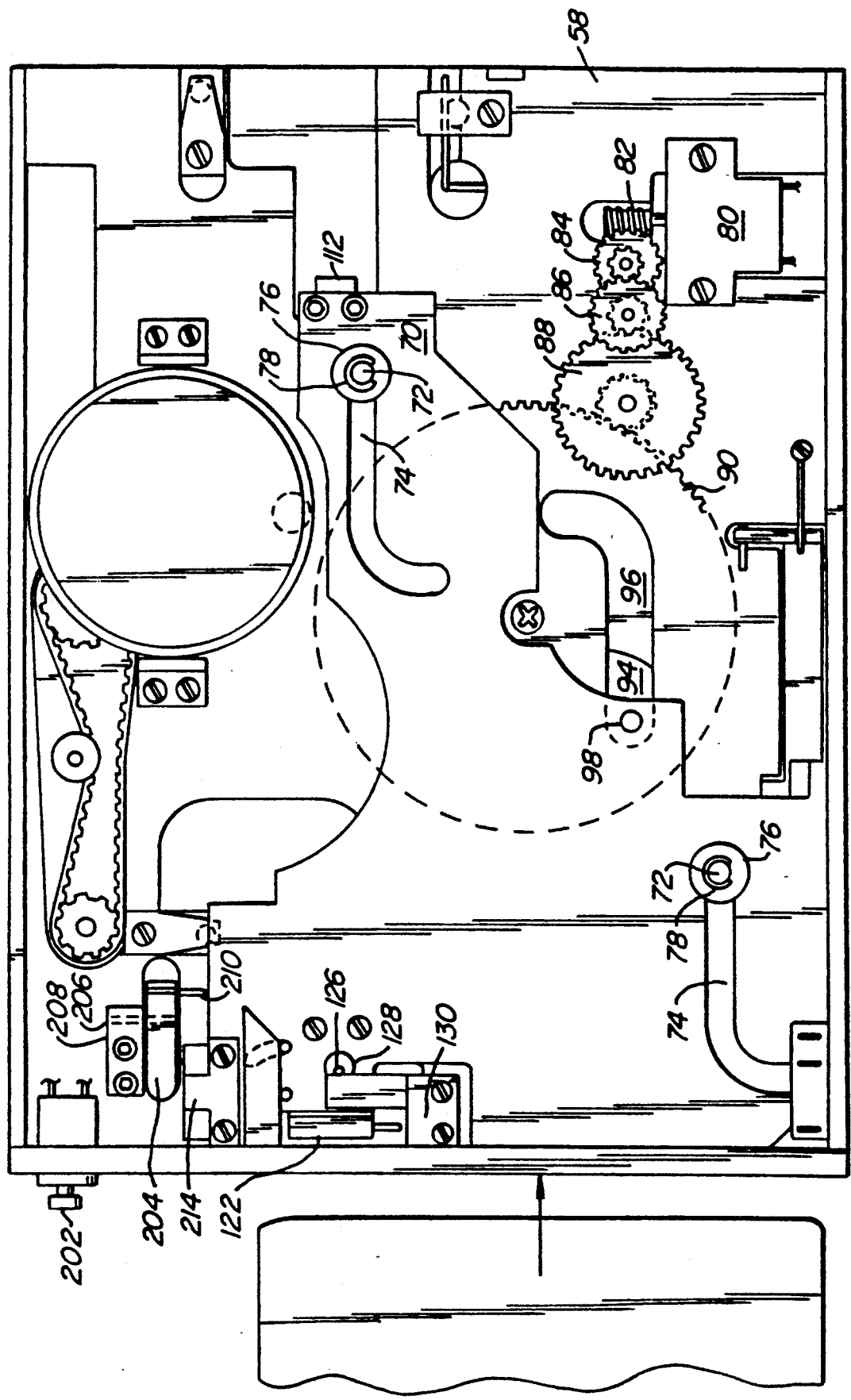
FIG._3.

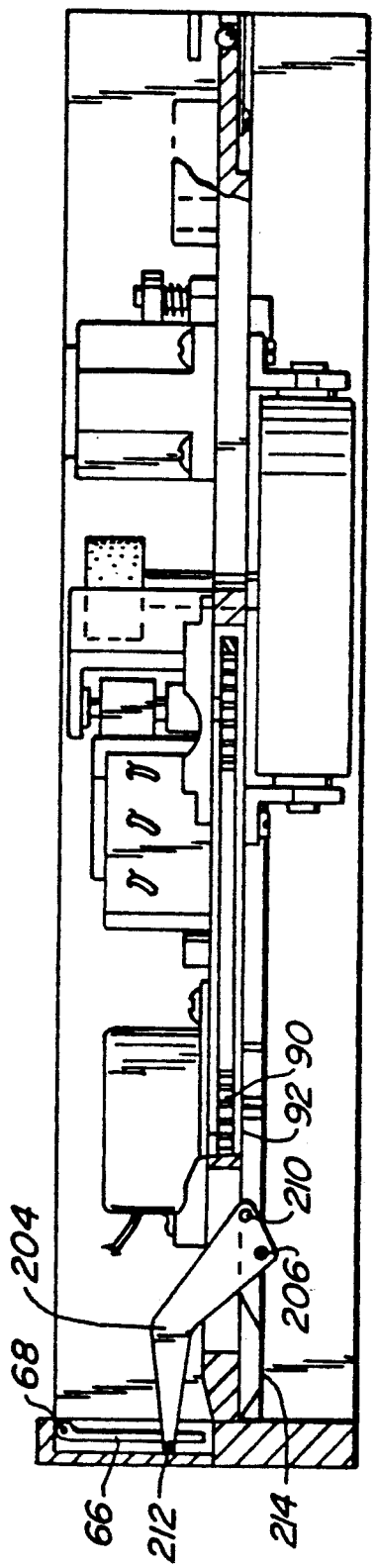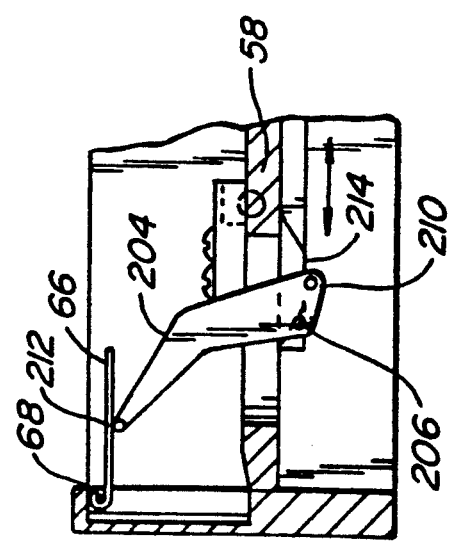

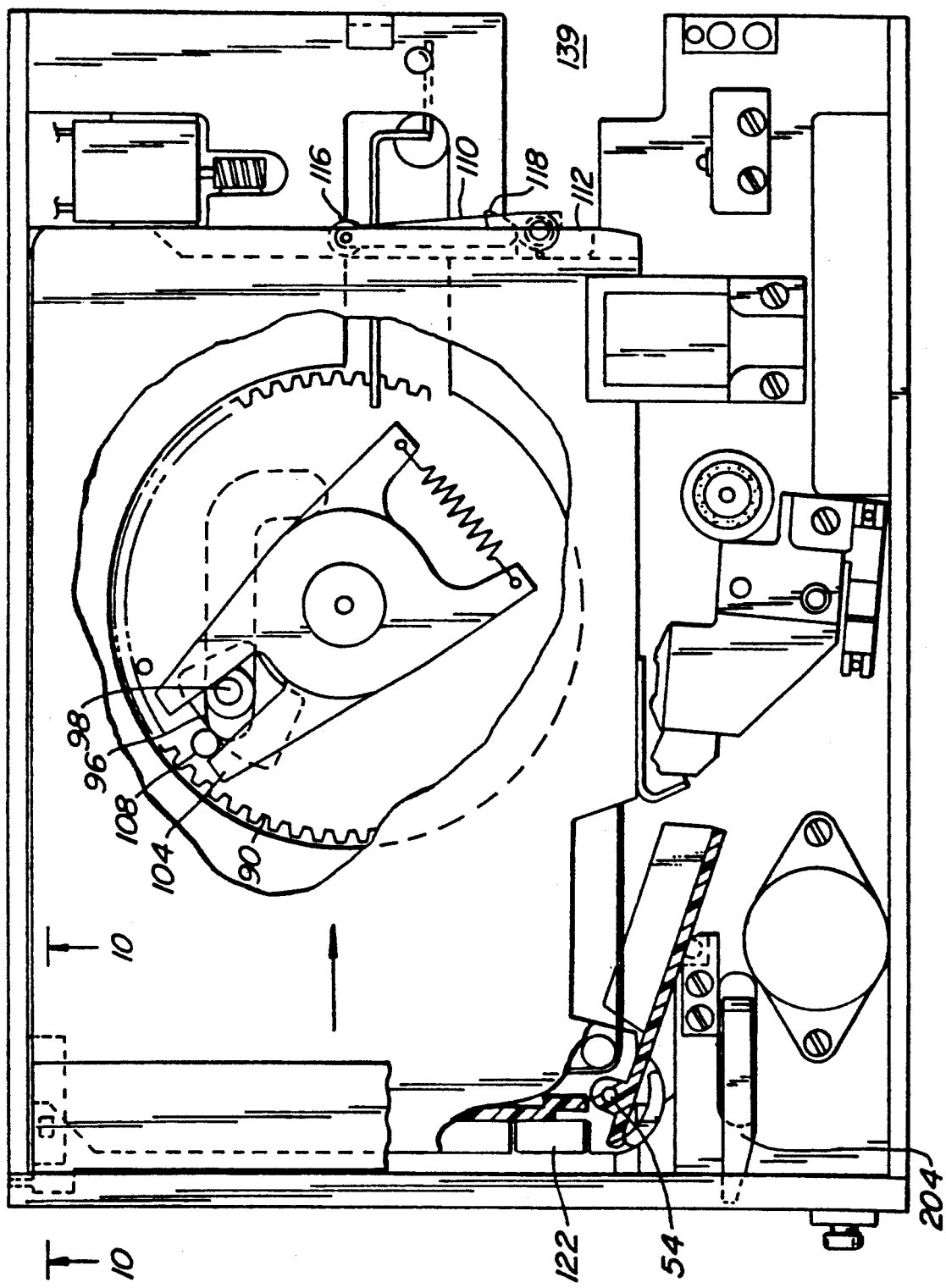
FIG._6.

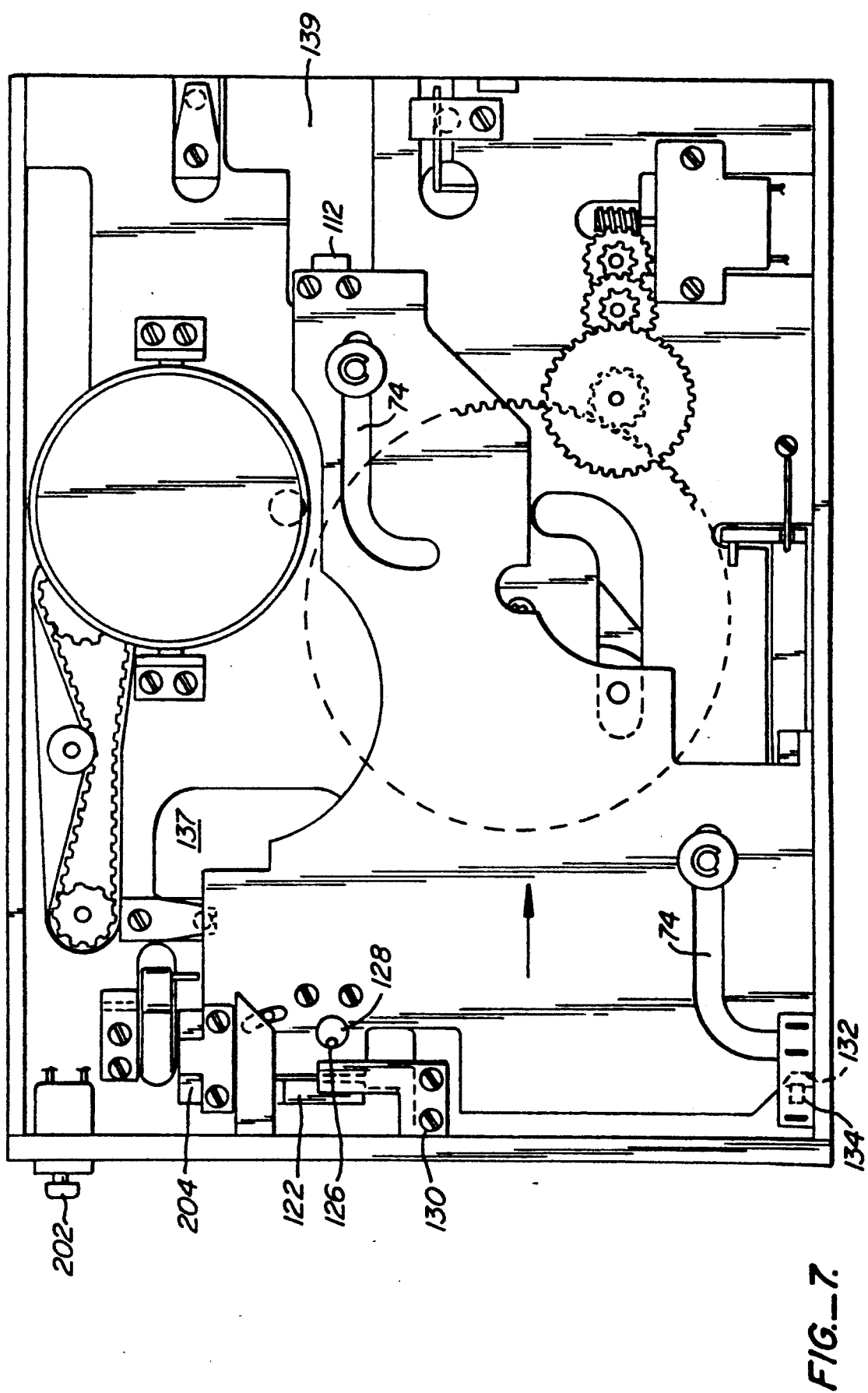

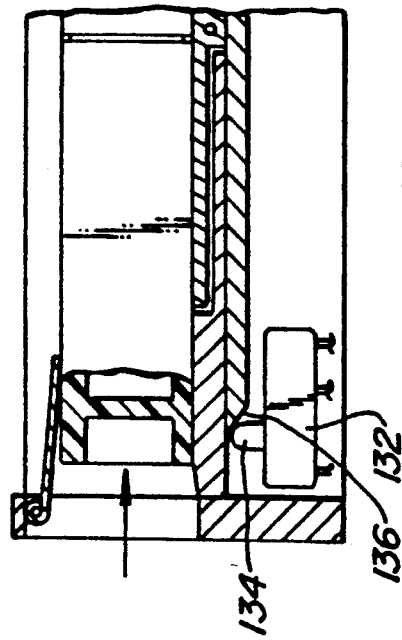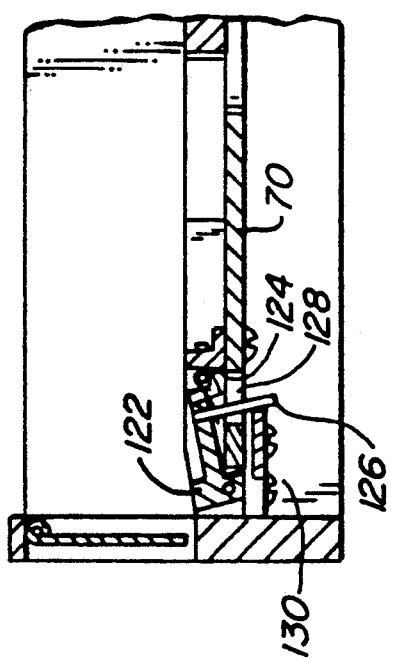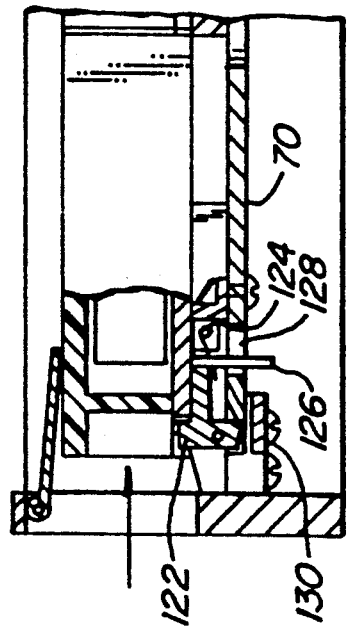

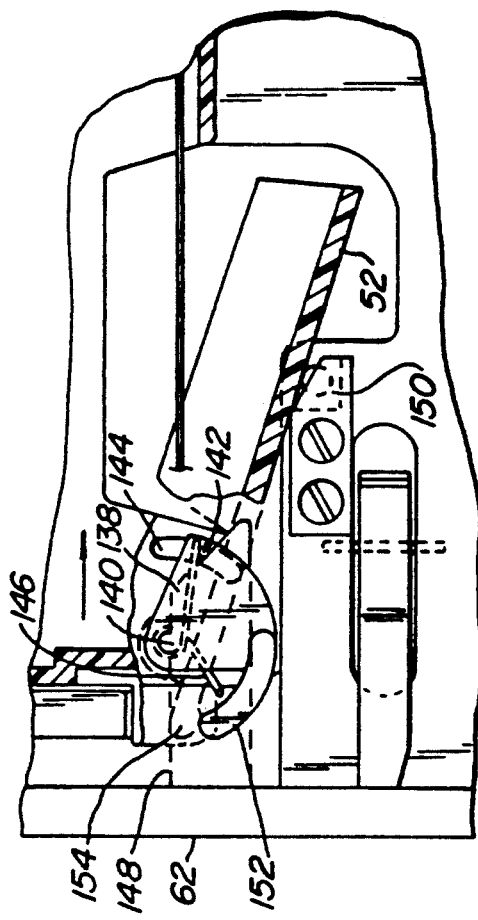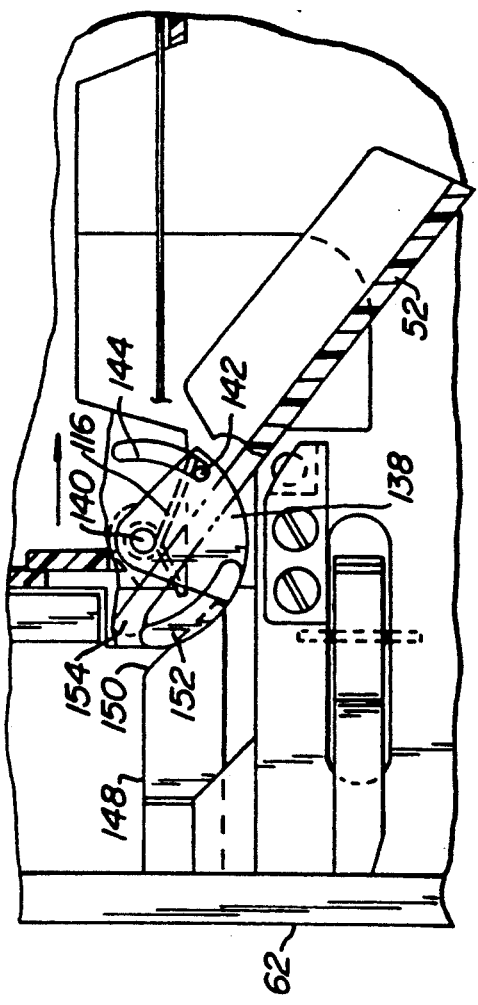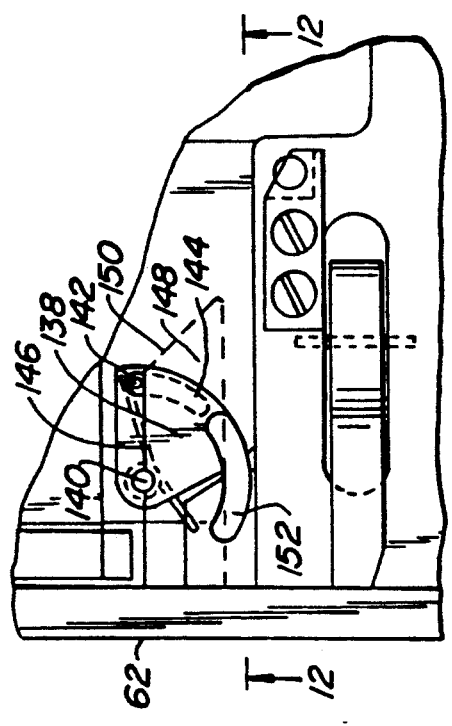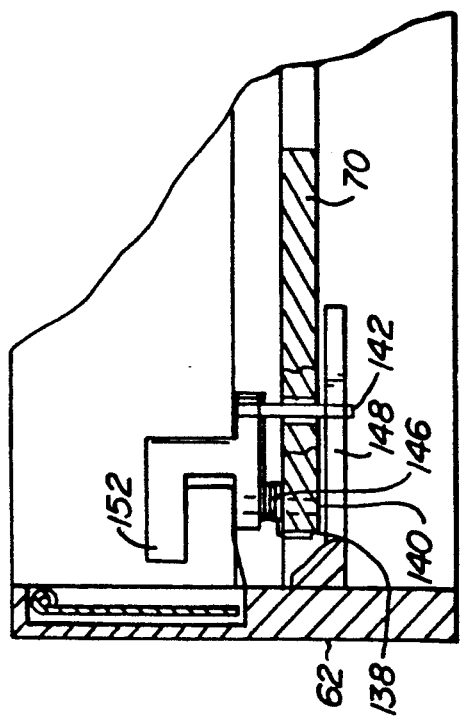

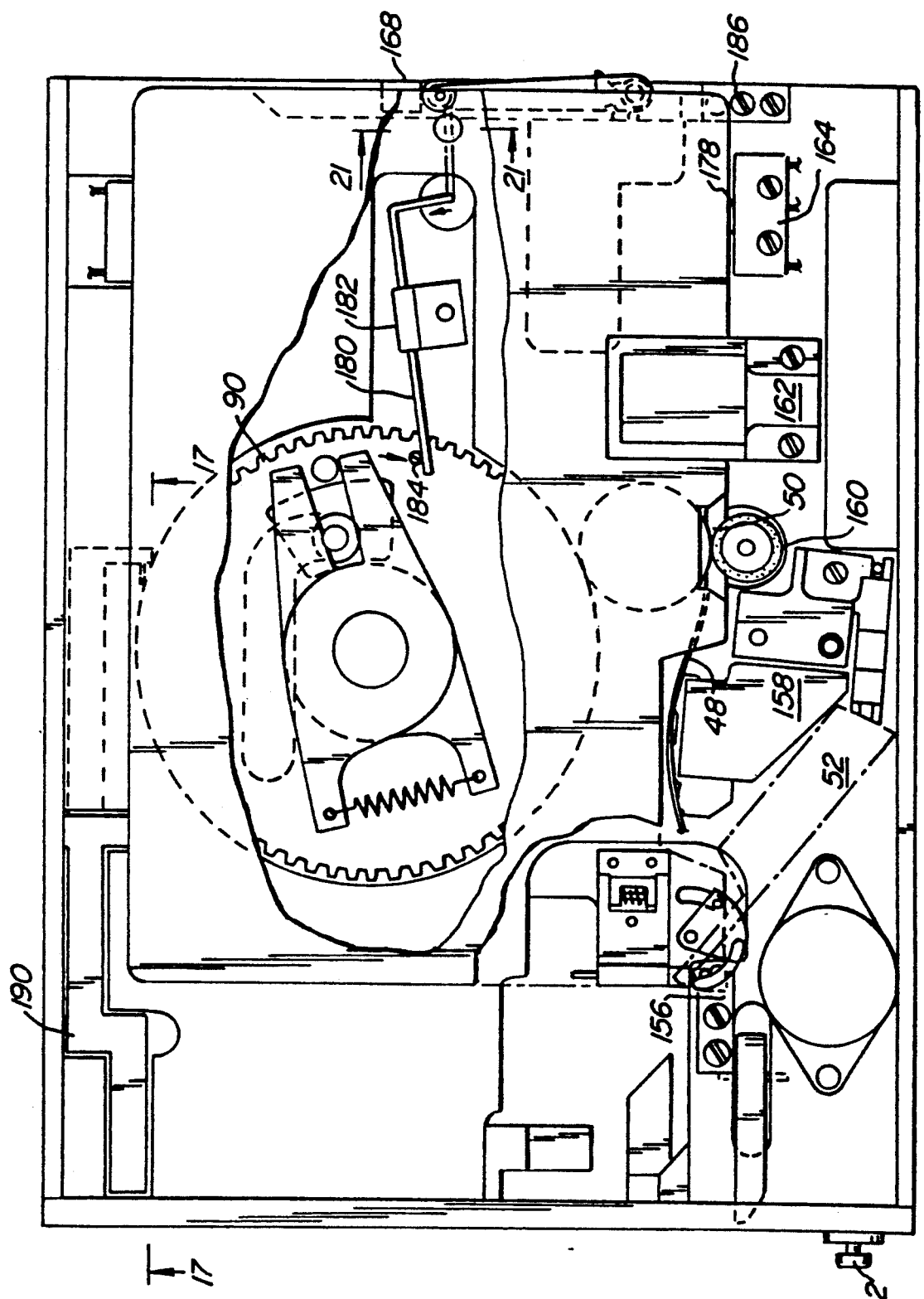
FIG._15.

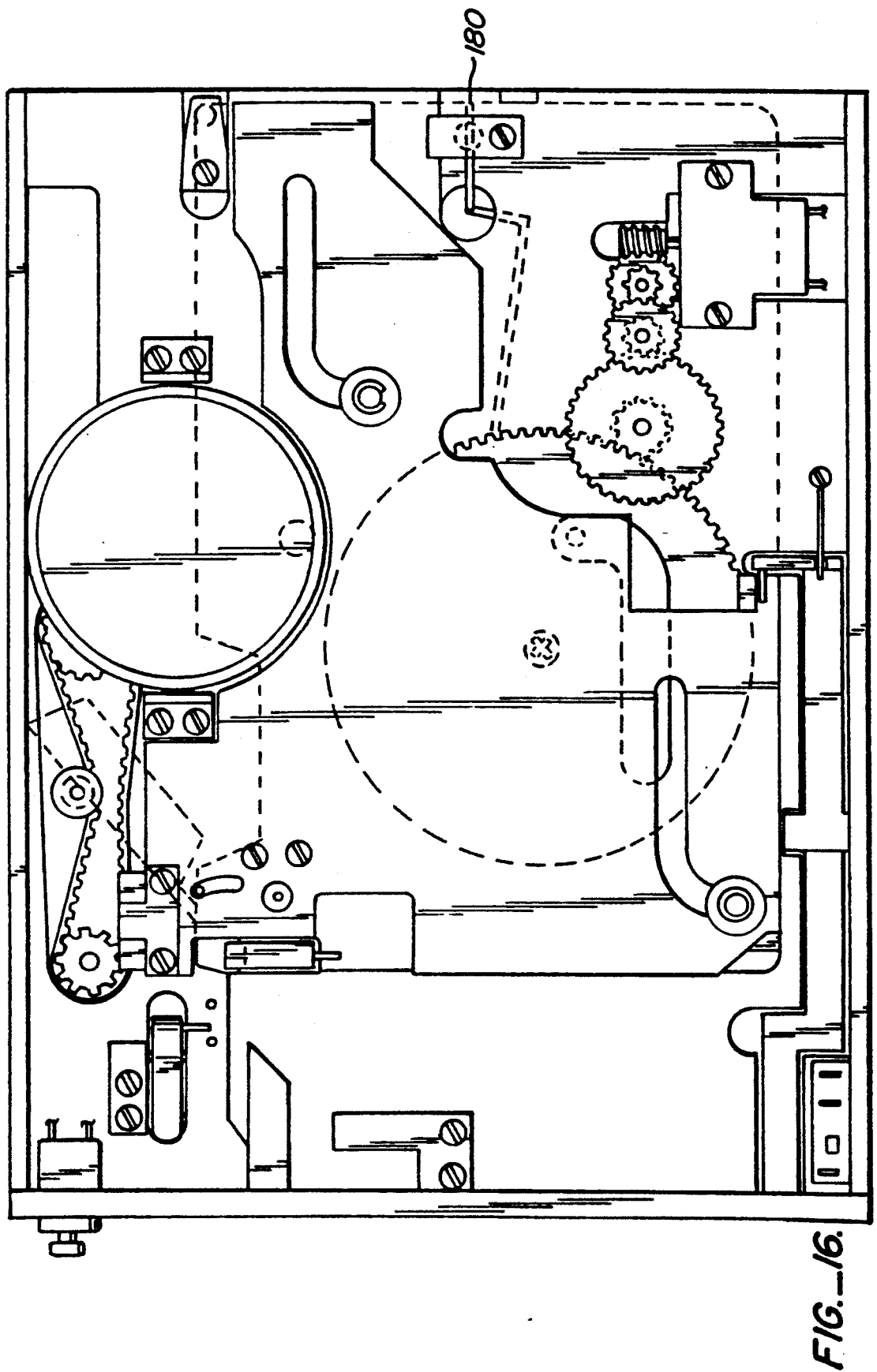

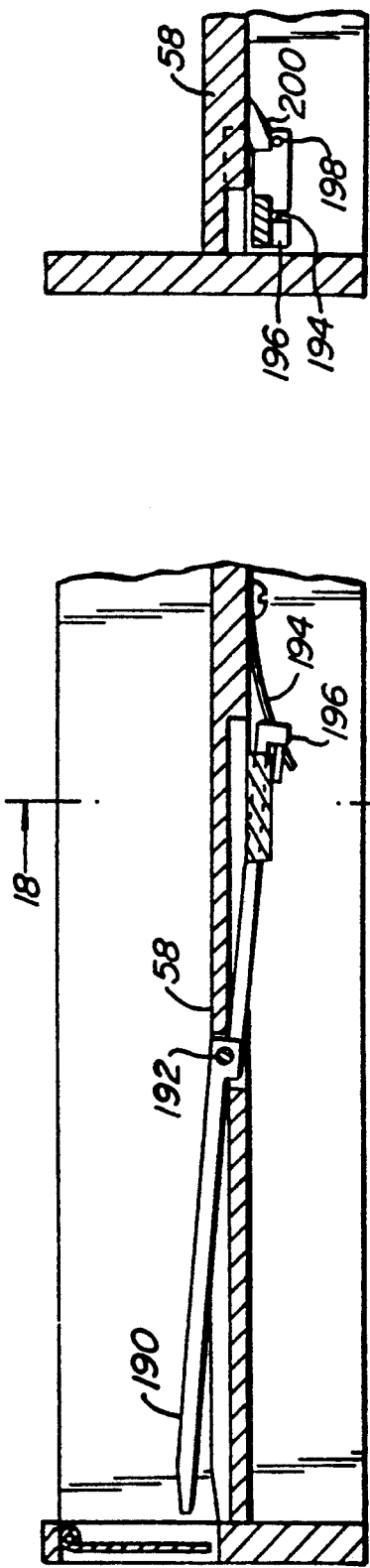
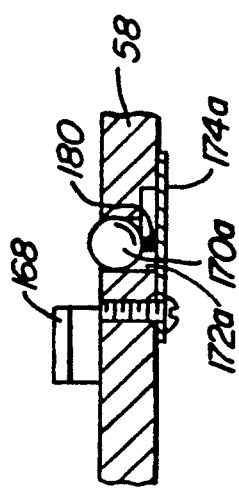
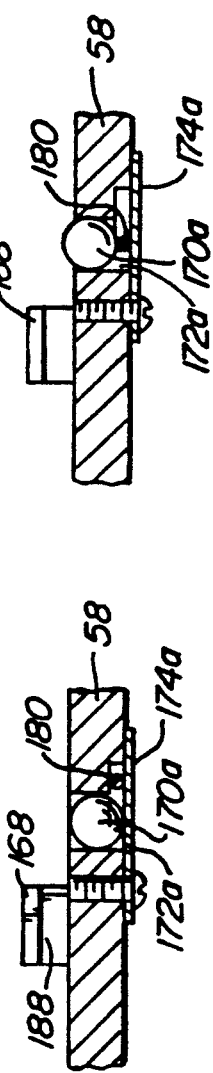
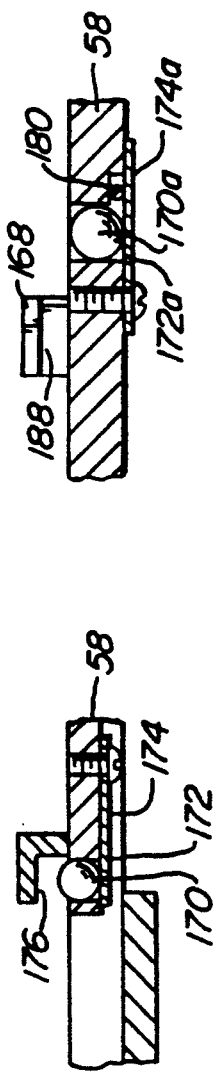
FIG._17.
FIG._18.
FIG._19.
FIG._20.
FIG._21.

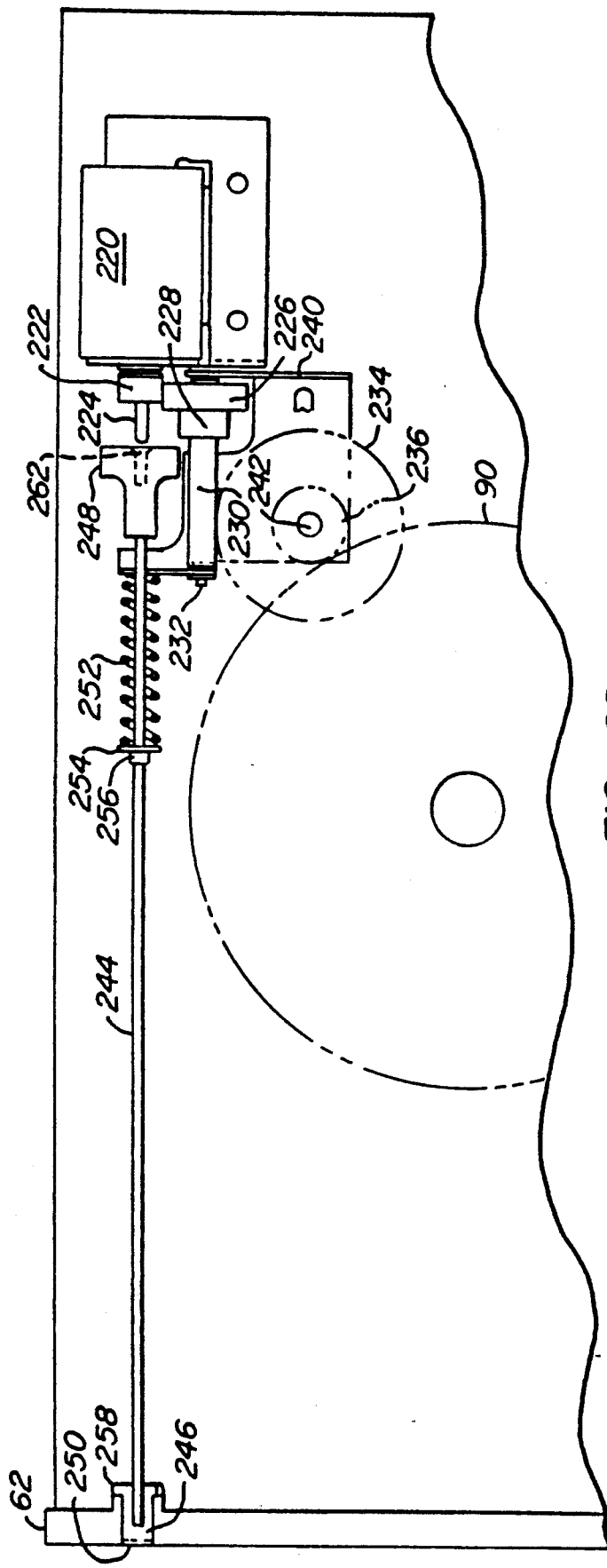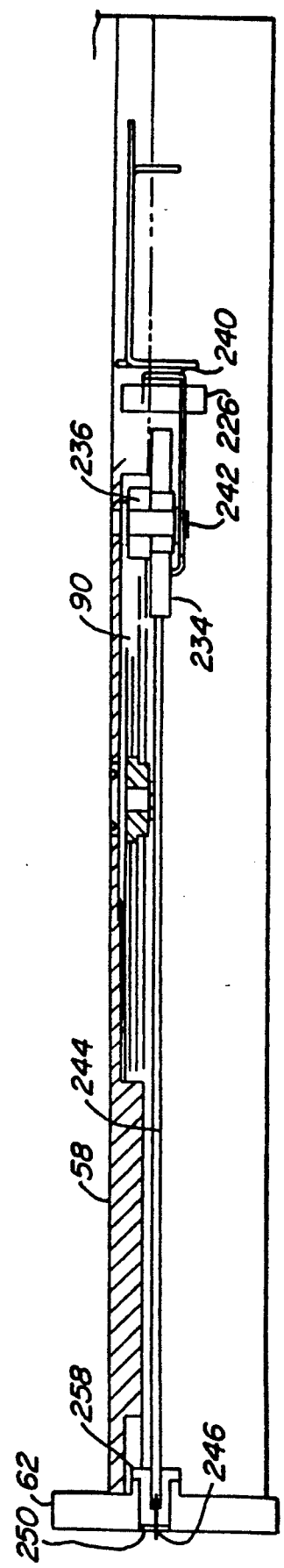
FIG._22.
FIG._23.

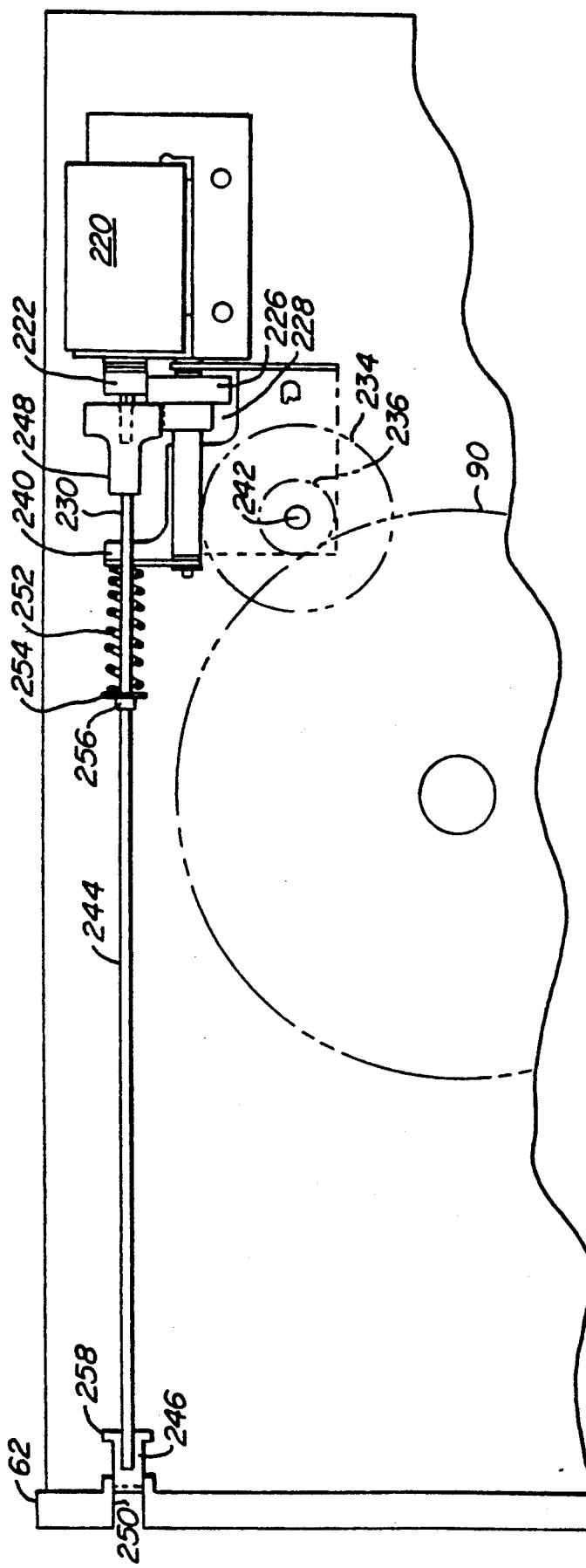
FIG._24.
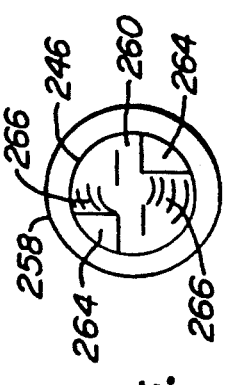
FIG._25.

CARTRIDGE TAPE DRIVE

RELATED APPLICATION

This application is a divisional application of prior application Ser. No. 07/433,700 filed Nov. 9, 1989, now abandoned.

BACKGROUND OF THE INVENTION

1. Field of the Invention

The present invention relates to a cartridge tape drive, and more particularly, to a cartridge tape drive in which a rectangular tape cartridge can be inserted endwise.

2. Description of Related Art

Because of technological innovations relating to small business and personal computers, such computers are becoming increasingly easy to use in an ever expanding number of applications. Improvements in technology have dramatically increased the speed and capacity of these small computers while simultaneously decreasing the cost of producing them. All of these factors, in combination with many others, have fueled a widespread public demand for smaller more powerful computers.

However, the advantages afforded by the increased speed and capacity of small business and personal computers can only be fully realized if there are corresponding improvements in the peripheral equipment associated with such computers. One area of particular concern is that of data storage and backup. The capacity of a typical computer's internal data storage system, typically a hard disk, has increased dramatically. Although there have been improvements in the reliability and capacity of traditional floppy disks, when compared to the internal storage capacity of many small business and personal computers, floppy disks are extremely limited. Accordingly, in order to maintain duplicate or backup copies of the internal memory it is frequently necessary to use a large number of floppy disks. This is both inefficient and inconvenient for the operator.

As a result, there is a demand for a reliable and efficient means of storing large amounts of data which can be quickly and conveniently transferred to or from the internal memory of a computer or some other data storage device. A magnetic tape cartridge such as the standard one-quarter inch tape cartridge defined by the industry standard ANSI X3.55-1977 is well suited as such a storage device. An example of such a tape cartridge is the DC300XL cartridge manufactured by Minnesota Mining and Manufacturing and described in U.S. Pat. No. 3,692,255. The ANSI cartridge measures approximately six inches in length and four inches in width. Further, the cartridge has a pivoting access door along one of its longitudinal edges which must be swung open to allow access to the magnetic tape within the cartridge. With the door fully open, the width of the cartridge is increased to approximately five and three-quarter inches.

This creates a problem because the industry standard for a five and one-quarter inch floppy disk drive requires that the drive fit within a rectangular box measuring three and one-quarter inches in height, five and three-quarter inches in width, and eight inches in length. This standard is referred to hereafter as the form factor or the five and one-quarter inch form factor. Additionally, a half-height form factor having a height of one and five-eighths inches with the same width and length is increasingly popular. As can be appreciated the width of the cartridge with the access door fully opened is approximately the same as the width of the form factors. This makes it extremely difficult to design a tape drive which will allow use of the cartridge and still fit within the form factors established by the industry.

Existing small business and personal computers are designed in accordance with the industry form factors. As a result, the cabinets of such computers cannot readily accommodate drives having dimensions larger than the form factors. Further, consumers are accustomed to the existing form factors and because of their desire for smaller more compact computers are unlikely to accept an increase in the size of drives. As a result, there is a need for a tape drive for the cartridge that is capable of fitting within the five and one-quarter inch form factor or the half height form factor.

Typically, when a drive is mounted within a computer cabinet only the front of the drive is accessible. The front of the drive measures five and three-quarters inches across and either three and one-quarter inches or one and five-eighths inches high, depending on whether the cabinet is designed in accordance with the full height or half height form factor. As a result, it is difficult for the cartridge which is approximately six inches in length to be inserted edgewise through the front of the drive.

Accordingly, one drive which is designed to use the cartridge has a drawer-like design. That is, the drive is designed to slide out of the cabinet like a drawer. This provides access to the side of the drive and allows edgewise insertion of the cartridge into the side of the drive. However, such a system requires a large number of moving parts which are subject to failure. Further, when the drive is slid out from the cabinet, sensitive elements of the drive may be exposed to damage or contamination which may impair the performance of the drive. Additionally, the sliding drive requires specially designed electrical busses or connectors which are likely to wear and possibly fail with extended use.

In an attempt to alleviate the problems associated with the sliding drive, another drive designed for use with the cartridge employs a stationary housing. The cartridge is inserted endwise through the front of the drive. In this drive, a slidable tray extends partially out of the front of the drive. The cartridge is placed on the tray and manually pushed into the drive. As the cartridge and tray are being pushed into the drive a telescoping, pivoting, spring loaded arm partially opens the cartridge access door to expose the tape. The magnetic head of the tape drive is mounted on a pivoting frame within the drive. When the tray and cartridge are in place within the drive, a lever situated on the front of the drive is rotated to pivot the frame, bringing the magnetic head into contact with the tape.

This drive contains a large number of moving parts which are subject to wear and prone to fail. Further, as with the drawer-like drive, the electrical connections to the head and other elements mounted on the pivoting frame typically are designed to allow for movement as the frame is pivoted. As a result, they are subject to wear and failure.

Additionally, it is difficult to ensure precise and reliable positioning of the head with respect to the cartridge. This is because the cartridge is located on a sliding tray and the head is mounted to a pivoting frame.

Because both elements are movable there is likely some play between the head and the tape. This problem is exacerbated as the elements of the drive wear during normal use. As a result of the difficulty in maintaining a consistent and precise relationship between the tape and the head, there is an increased likelihood of errors occurring as data is transferred to or from the tape. As the track density of tapes is increased, tolerances are decreased and it is increasingly important to ensure the proper and consistent location of the tape with respect to the head.

SUMMARY OF THE INVENTION

Accordingly, it is an object of the present invention to provide a compact cartridge tape drive which accommodates the endwise insertion of a rectangular cartridge having an access door along a side longitudinal edge thereof which must be opened to provide access to the tape within the cartridge.

A further object of the invention is to provide a cartridge tape drive which allows for the precise and repeatable positioning of the tape with respect to the head.

Another object of the invention is to provide a cartridge tape drive which has an uncomplicated structure, is reliable, easy to manufacture, and simple to operate.

In accordance with these and other objects, a cartridge tape drive in accordance with a preferred embodiment of the present invention has a housing with an opening dimensioned to allow endwise insertion of a rectangular cartridge having an access door along a side edge thereof. The cartridge is supported on a stationary support within the housing. The cartridge tape drive is provided with a mechanism which opens the access door, and a mechanism which moves the cartridge laterally within the housing into operative engagement with a magnetic head. The magnetic head as a result may be attached to a stationary support In another aspect of the invention, the cartridge tape drive includes a mechanism which allows for manual removal of the cartridge from the drive.

BRIEF DESCRIPTION OF THE DRAWINGS

FIG. 1 is a perspective view of a cartridge tape drive in accordance with a preferred embodiment of the present invention and a cartridge for use therein.

FIG. 2 is a top view of the cartridge tape drive of FIG. 1.

FIG. 3 is a bottom view of the cartridge tape drive of FIG. 1.

FIG. 4 is a sectional view taken along line 4—4 in FIG. 2.

FIG. 5 is a partial sectional view similar to FIG. 4 but showing the details of the bezel door opening mechanism in the open position.

FIG. 6 is a top view of the cartridge tape drive of FIG. 1 with the cartridge partially inserted and the access door partially open. A portion of the cartridge is cutaway to show the details of the overtravel mechanism.

FIG. 7 is a bottom view of the cartridge tape drive of FIG. 1 with the cartridge in the same position shown in FIG. 6.

FIG. 8 is a partial sectional view taken along line 8—8 in FIG. 2 showing the details of the retractable indexing block in the retracted position.

FIG. 9 is a partial sectional view similar to FIG. 8 but with the cartridge partially inserted and the retractable indexing block in the engaged position.

FIG. 10 is a partial sectional view taken along line 10—10 in FIG. 6 showing the drive motor activation switch.

FIG. 11 is a partial top view of the cartridge tape drive of FIG. 1 showing the details of the access door opening mechanism prior to insertion of the cartridge.

FIG. 12 is a partial sectional view taken along line 12—12 in FIG. 11.

FIG. 13 is a partial top view of the cartridge tape drive of FIG. 1 showing the details of the access door opening mechanism with the cartridge partially inserted and the access door partially open.

FIG. 14 is similar to FIG. 13 with the cartridge further inserted and the access door further open.

FIG. 15 is a top view of the cartridge tape drive of FIG. 1 with the cartridge fully inserted. The cartridge is shown partially cutaway to show the details of the overtravel mechanism.

FIG. 16 is a bottom view of the cartridge tape drive of FIG. 1 with the cartridge fully inserted. The cartridge is shown partially in phantom.

FIG. 17 is a partial sectional view taken along line 17—17 in FIG. 15 showing the details of the bezel door locking mechanism in the locked position.

FIG. 18 is a partial sectional view taken along line 18—18 in FIG. 17.

FIG. 19 is a partial sectional view taken along line 19—19 in FIG. 2 showing the details of a corner positioning block.

FIG. 20 is a partial sectional view taken along line 20—20 in FIG. 2 showing the details of the edge positioning block prior to insertion of the cartridge.

FIG. 21 is a partial sectional view taken along line 21—21 in FIG. 15 showing the details of the edge positioning block with the cartridge fully inserted.

FIG. 22 shows a top view of a drive mechanism in accordance with an alternative embodiment of the present invention.

FIG. 23 is a side view of the drive mechanism of FIG. 22.

FIG. 24 is a top view showing the drive mechanism of FIG. 22 in the engaged position.

FIG. 25 is an enlarged end view of the manual withdrawal button showing the configuration of the slot.

DESCRIPTION OF THE ILLUSTRATED EMBODIMENT

A cartridge tape drive in accordance with a preferred embodiment of the present invention is indicated in FIG. 1 at reference numeral 30. A tape cartridge for use with the drive 30 is indicated as reference numeral 32. The illustrated tape cartridge conforms with ANSI specification X3.55-1977, and is well known to those skilled in the art.

The cartridge 32 is inserted into the cartridge tape drive 30 through a bezel door 65 (FIGS. 1 and 2). While within the cartridge tape drive 30, the cartridge is supported by a stationary support tray 58. Upon insertion, the cartridge is gripped between indexing block 112 and retractable indexing block 122 which engage indexing notches 44a and 44b, respectively (FIGS. 6-10). Indexing block 112 and retractable indexing block 122 are attached to a sliding carriage 70. In this manner, the cartridge 32 moves on the support tray 58 when the sliding carriage 70 moves. A door opening mechanism opens an access door 52 of the cartridge 32 while the cartridge 32 is within the drive 30 (FIGS. 11-14).

A moving mechanism which is activated after the cartridge is within the drive, moves the sliding carriage 70, and hence the cartridge 32, within the drive 30 from a forward position (FIG. 6) to a rear position (FIG. 15). The path of the carriage 70 is first rearward toward the back of the drive 30 and then laterally toward a side of the drive 30. The path is defined by the interaction of posts 72 and 98 with slots 74 and 96, respectively (FIGS. 2, 3, 7, and 16). During the lateral movement of the carriage 70 the cartridge 32 is moved into a position in which a magnetic head 158 engages a portion of a magnetic tape 48 exposed by the open access door 52 (FIGS. 15 and 16). The details of the cartridge 32 and the cartridge tape drive 10 are described below.

As seen in FIG. 1, the cartridge has a metal base plate 34, a top cover 36, two end walls 38, a rear side wall 40, and a front side wall 42. The end walls 38 are inset slightly from the end edge of the base plate 34 and the top cover 36. The front and rear ends of the baseplate 34 are each provided with an indexing notch 44a and 44b, respectively, which extends from the edge of the base plate 34 inward to the end wall 38.

A pair of spools 46 are rotatably mounted within the cartridge 32. A magnetic tape 48 is wrapped around the spools 46 with a portion extending between the spools 46. The tape path between the spools 46 is defined by idler rollers (not shown) such that a portion of the tape between the spools 46 extends lengthwise within the cartridge 32 slightly behind the front side wall 42. A capstan roller 50, which is accessible through a cut away portion of the cartridge, drives a drive belt (not shown) which rotates the spools 46 to move the tape 48 from one spool to the other.

The cartridge 32 has a cut away portion which receives an access door 52. The access door 52 pivots about hinge 54 to allow access to a portion of the magnetic tape 48. The cartridge 32 measures approximately six inches in length and four inches in width. With the access door 52 fully open, the cartridge 32 measures approximately five and three-quarter inches in width.

The cartridge tape drive 30 has a housing 56 whose width, height, and length are such that housing will fit within the industry five and one-quarter inch form factor. In the illustrated embodiment, the housing will fit within the half height form factor. The housing of the illustrated embodiment includes a support tray 58, side walls 60, and a front wall 62. As used herein, the term "housing" refers to the general support structure and frame of the cartridge tape drive 30 and not necessarily to any type of enclosure. Similarly, when a component is described as being "within the housing" it means that the item would fit within an imaginary box defined by the form factor.

As seen in the illustrated embodiment, the housing 56 will typically be open and allow free access to the internal components of the drive 30. This is because the drive 30 is typically installed within a cavity in a cabinet of a larger computer system. In such an environment the cabinet will provide a protective enclosure. However, should an enclosure be required for a particular application of the tape drive it could be readily fabricated and integrated into the illustrated housing by one skilled in the art.

As illustrated in FIGS. 1 and 2, the front wall 62 is provided with an opening 64 through which the cartridge 32 can be inserted endwise. The opening 64 is covered by a bezel door 66 to prevent dust and other contaminants from entering the drive. As best seen in FIG. 4, the bezel door 66 is suspended from a hinge 68 along the top of the opening 64. The hinge 68 is spring loaded so that the bezel door 66 is normally urged into the closed position. However, the spring force can easily be overcome and the bezel door 66 can be manually opened by inserting the cartridge 32 through the opening 64.

Upon insertion of the cartridge 32 into the drive 30, the base plate 34 is received and supported by the upper surface of the stationary support tray 58. A sliding carriage 70 is provided to move the cartridge 32 within the drive 30. As best seen in FIG. 3, the sliding carriage 70 is suspended below the support tray 58. The sliding carriage 70 is maintained against the lower surface of the support tray 58 by means of posts 72 which are fixed to the lower surface of the support tray 58, and extend through slots 74 in the carriage. A washer 76 is held in place on the end of each post 72 by a split ring 78. In this manner the sliding carriage 70 is sandwiched between the support tray 58 and the washers 76. The distance between the support tray 58 and the washers 76 is slightly greater than the thickness of the sliding carriage 70. This allows the sliding carriage 70 to slide freely along a path determined by the shape of the slots 74.

Movement of the sliding carriage 70 is accomplished by means of a drive mechanism, the components of which are best seen in FIGS. 2 and 3. The drive mechanism includes a drive motor 80 and a worm gear 82 attached to the output shaft of the drive motor 80. The worm gear 82 drives a first reduction gear 84 which drives a second reduction gear 86 which drives a third reduction gear 88. The third reduction gear 88 drives the main drive gear 90 and an overtravel mechanism 100. The main drive gear 90 and the overtravel mechanism 100 are mounted in a recess 92 formed in the top surface of the support tray 58. The recess 92 is of a depth such that the top of the main drive gear 90 and the overtravel mechanism 100 are below the top surface of the support tray 58 and do not interfere with the insertion of the cartridge 32.

The main drive gear 90 is provided with an aperture 94 and the support carriage 58 is provided with a slot 96 which corresponds to the path defined by slots 74 in the sliding carriage 70. A guide post 98 extends upward from the sliding carriage 70 through the slot 96 and the aperture 94 where it is received by the overtravel mechanism 100.

The overtravel mechanism 100 allows for slight disparities in the movement of the sliding carriage 70 and the drive mechanism. The overtravel mechanism 100 includes two legs 102 and 104 which are pivotably mounted on the center axis of the main drive gear 90. The legs 102 and 104 are configured in a manner similar to the two parts of a pair of scissors. A spring 106 extends from the short end of leg 102 to the short end of leg 104 and urges both the short ends and the long ends of the legs together. A post 108 extends upward from the top of the main drive gear 90 and is received between the long ends of the legs 102 and 104.

The post 108 serves two major functions. First, it maintains a slight amount of separation between the long ends of legs 102 and 104, thereby defining a radial slot within which the guide post 98 is received. Second, because the post 108 is fixed to the main drive gear 90, it causes the overtravel mechanism 102 to rotate as the main drive gear 90 rotates. In this manner, the legs 102 and 104 of the overtravel 100 move the guide post 98, and hence the sliding carriage 70, along the path defined by slot 96 as the main drive gear 90 rotates. The action of the posts 72 within the slots 74 helps to assure a smooth uniform movement and prevent binding as the sliding carriage 70 is moved by rotation of the main drive gear 90.

As the cartridge 32 is inserted through the opening 64, the base plate 34 slides along the top surface of the support tray 58 until the end wall 38 of the cartridge 32 encounters an arm 110. The arm 110 is pivotably mounted on an indexing block 112 which is fixed to the sliding carriage 70. As the cartridge 32 is pushed further into the drive 30 it presses against the arm 110 causing it to pivot about axis 114 until the arm 110 is generally parallel to the cartridge end wall 38 as shown in FIG. 6. The end of the arm 110 is provided with a roller 116 which allows the arm 110 to slide freely along the end wall 38 as the arm 110 pivots. The arm 110 is provided with a spring 118 which biases arm 110 into a position against a stop 120. In this manner, the are 110 pushes against the end wall 38 to assist in ejecting the cartridge 32 during the eject procedure described below.

Upon further insertion of the cartridge 32, indexing block 112 is received in cartridge indexing notch 44a. With the indexing block 112 received in the indexing notch 44a and abutting the leading edge of the base plate 34, further insertion of the cartridge 32 requires movement of the sliding carriage 70. However, until the drive motor 80 is activated it serves as a brake and resists manual movement of the main drive gear 90.

Nevertheless, the carriage 70 can move slightly as a result of the overtravel mechanism 100. As illustrated in FIG. 6, the sliding carriage 70 can be moved slightly by applying pressure to the cartridge 32. The movement is accomplished by overcoming the force of the overtravel spring 106 to spread the legs 102 and 104 of the overtravel mechanism 100. During the slight manual movement of the sliding carriage 70 allowed by the overtravel mechanism 100, three events occur.

First, a retractable indexing block 122, seen best in FIGS. 2, 6, 8, and 9, moves from its retracted position (FIGS. 2 and 8) to its engaged position (FIGS. 6 and 9). When the retractable indexing block is in the engaged position, the cartridge is gripped between the retractable indexing block and the indexing block. This allows the cartridge to be moved by moving the sliding carriage to which the retractable are attached. The retractable indexing block 122 is hingedly mounted to the upper surface of the sliding carriage 70. A spring 124 biases the retractable indexing block 122 upward. A stud 126 extends downward from the retractable indexing block 122 through aperture 128 in the sliding carriage 70. Extending from the front wall 62 below the sliding carriage 70 is a block 130. Block 130 is positioned such that when the sliding carriage 70 is in the forward position, illustrated in FIGS. 2 and 8, the block 130 engages the stud 126 to overcome the force of the spring 124 and maintain the retractable indexing block 122 in its retracted position so as not to obstruct insertion of the cartridge 32. As the sliding carriage 70 moves rearward, the stud 126 moves out of engagement with the block 130, thereby allowing the retractable indexing block 122 to move under the force of spring 124 to the engaged position as shown in FIGS. 6 and 9. In the engaged position, the retractable indexing block 122 is received by indexing notch 44b.

Another event which occurs during the slight manual movement of the sliding carriage 70 allowed by the overtravel mechanism 100 is the activation of the drive motor 80. As illustrated in FIG. 10, a switch mechanism 132 is mounted to the side wall 60. Extending upward from the switch mechanism 132 is a spring loaded switch actuator 134. When the sliding carriage 70 is in the forward position it is directly above the switch actuator 134, as seen in FIG. 3, and maintains the actuator 134 in a depressed position. However, as the sliding carriage 70 moves rearward, it moves away from the switch actuator 134 allowing the spring loaded switch actuator 134 to move to a raised position. A ramp 136 is provided to ensure a smooth transition as the switch actuator 134 moves between the depressed position and the raised position.

The movement of the switch actuator 134 from the depressed position to the raised position activates the drive motor 80, which, as explained above, drives the main drive gear 90 to move the sliding carriage inward. Because the cartridge 32 is held firmly between the indexing block 112 and the retractable indexing block 122, the cartridge 32 is pulled inward with the sliding carriage 70 along a path defined by slots 74 and 96. Cutout areas 137 and 139 are provided in the support tray 58 to accommodate the indexing block, retractable indexing block, and the access door opening mechanism as the sliding carriage moves during the loading process.

As illustrated in FIG. 6, the other event which takes place during the initial manual movement of the sliding carriage 70 is beginning of the access door 52 opening sequence. The access door 52 continues to open as the cartridge 32 is moved into the tape drive 30 by the drive mechanism. The details of the access door opening sequence are best illustrated in FIGS. 11–14. The access door opening mechanism includes a pivoting member 138 rotatably mounted on a shaft 140 which extends upward from the sliding carriage 70. Shaft 140 is positioned such that it is generally coaxial with the hinge 54 of the access door 52 when the cartridge 32 is gripped between the indexing block 112 and the retractable indexing block 122. A spring 146 biases the pivoting member 138 in the clockwise (as viewed from the top) direction.

A receiving block 148 having an angled cam surface 150 extends rearward from the front wall 62 below the level of the sliding carriage 70. A stud 142 extends downward from the pivoting member 138 through an arcuate slot 144 provided in the sliding carriage 70 and, when in the forward position (illustrated in FIG. 12), engages an edge of the receiving block 148. As the carriage 70 moves inward, the stud 142 follows the angled cam surface 150, thereby allowing the pivoting member 138 to pivot under the force of spring 146. The pivoting member 138 is provided with a finger 152 which, as the pivoting member 138 pivots, engages the rear extension 154 of the access door 52 to push the access door open. As can be appreciated, the biasing force of spring 146 must be greater than that of the spring which maintains the access door 52 in the closed position.

Initially, the degree to which the pivoting member 138 is allowed to pivot, and hence the degree to which the access door 52 is opened, is limited by the engagement of the stud 142 with the angled surface 150. However, as the sliding carriage reaches the position illustrated in FIG. 13, the opening of the access door 52 is limited by the door contacting corner positioning block 156. As the access door 52 moves beyond the corner positioning block 156, the opening of the door by the pivoting member 138 is limited by the engagement of the stud 142 with the end of the arcuate slot 144 of the sliding carriage 70, as seen best in FIG. 14. It should be appreciated that it is not necessary for the access door to be completely open. Rather, as shown in FIG. 15, the access door 52 needs to open only far enough to allow the magnetic head 158 to access the magnetic tape 48.

Following activation of the drive motor 80, the main drive gear 90 automatically moves the sliding carriage 70, and hence the cartridge 32 which is gripped between the indexing block 112 and the retractable indexing block 122, inward along the path defined by slots 74 and 94. Initially this path is straight back toward the rear of the tape drive 30. However, as the posts 72 and the guide post 98 follow slots 74 and 94, the path of travel curves to move the sliding carriage 58 and the cartridge 32 laterally toward a side of the drive 30. In this manner, the portion of the magnetic tape 48 revealed by the open access door is brought into contact with the magnetic head 158 and the capstan roller 50 is brought into contact with the capstan drive 160. Additionally, the cartridge is correctly positioned with respect to the end-of-tape/beginning-of-tape sensor 162 and the file protect sensor 164.

As illustrated in FIG. 15, the final position of the cartridge 32 is defined by the corner positioning blocks 156 and 166 and the edge positioning block 168. Each of the corner positioning blocks 156 and 166 receives a corner of the base plate 34 and limits movement of the cartridge 32 in the direction of the head 158 or sideways with respect to the head 158. A switch actuator 178 (located directly below and hidden in the drawings by the file protect sensor 164) is positioned such that it is depressed by the base plate 34 when the base plate abuts the inner surface of corner positioning blocks 156 and 166. Depression of the switch actuator 178 stops the drive motor 80. However, the spring force of the overtravel mechanism 100 biases the cartridge against the inner surface of the corner positioning blocks to ensure accurate positioning of the cartridge.

As illustrated in FIG. 19, the base of each corner block is provided with a ball bearing 170 situated within an aperture 172 in the support tray 58. The ball bearing 170 is seated on a leaf spring 174. The distance between the top of the ball bearing 170 and the inside top surface 176 of the corner positioning block is slightly less than the thickness of the base plate 34. As a result, when the base plate 34 enters the corner positioning block the leaf spring 174 flexes and presses the base plate 34 firmly against top surface 176. In this manner two corners of the cartridge are firmly and precisely positioned in a predictable and repeatable manner.

The edge positioning block 168 defines a third positioning point. As seen in FIGS. 20 and 21, a ball bearing 170a is situated within an aperture 172a and mounted leaf spring 174a. A slender rod 180 is positioned immediately above the leaf spring 174a. As illustrated in FIGS. 6 and 15, the slender rod is received by a pivotably mounted collar 182 and extends within a recess provided in the support tray from the ball bearing 170a to the main drive gear 90. A stud 184 is positioned on the main drive 90 such that as the cartridge reaches its final position the stud 184 engages one end of the slender rod 180. This causes the slender rod 180 to pivot about collar 182 and moves the other end of the slender rod from a position adjacent the ball bearing 170a (FIG. 20) to a position beneath the ball bearing 170a (FIG. 21). This movement causes the ball bearing 170a to raise and press the base plate 34 firmly against the inner top surface 188 of the edge positioning block. This arrangement advantageously reduces friction and the load on the drive motor because the base plate 34 is not pressed against surface 188 until the cartridge is nearly in its final position.

The two corner positioning blocks 156 and 166 and the edge positioning block 168 accurately define three precise points, and hence a plane, which determine an accurate and repeatable final position for the cartridge. Further, because the corner positioning blocks 155 and 166, the edge positioning block 168, and the magnetic head 158 are all mounted on the stationary support tray 58, there is not relative movement therebetween and the accuracy of the position of the cartridge with respect to the head is greatly enhanced. This accurate relationship between the position of the head and the tape is necessary to ensure proper functioning of the drive during the transfer of information to or from the tape.

In the present drive the capstan drive 160, the end-of-tape/beginning-of-tape sensor 162, and the file protect sensor 164 are also fixed to the stationary support tray. As a result, the electrical connections to these elements can be less complex and more reliable than those necessary to connect to movable elements.

It should be noted that this invention is directed mainly to the mechanical features of the drive 30. There is no detailed description of the function and operation of the capstan drive 160, the end-of-tape/beginning-of-tape sensor 162, and the file protect sensor 164. Similarly, there is no detailed description of the logic and control elements associated with the present drive. Further, although the magnetic head is mounted to the support tray in such a manner as to allow the head to be moved between various tracks on the tape, there is no detailed description of the mounting or track adjusting mechanism. This is because these elements are well known to those skilled in the art. Further, the function and operation of these elements may vary widely depending on the desired function of any given drive embodying the present invention. However, it should be noted that the space below the sliding carriage 70 is designed to receive the necessary circuitry associated with these elements.

As a precautionary feature to prevent the accidental insertion of a second cartridge into the drive, the drive is provided with a mechanism which locks the bezel door 66 when the sliding carriage is in the rear position. The mechanism, which is shown best is FIGS. 15–18, includes an elongate member 190 mounted on the support tray 58. The elongate member 190 is pivotable about pin 192. A leaf spring 194 is mounted to the bottom of the support tray 58 in engagement with a first end 196 of the elongate member 190. The leaf spring 194 biases the elongate member 190 into the plane of the support tray 58.

A post 198 extends from the first end of the elongate member 190 in a direction parallel to and slightly separate from the lower surface of the support tray 58. The sliding carriage is provided with a beveled portion 200 positioned to engage the post 198 and urge the first end of the elongate member, against the force of the spring 194, away from the lower surface of the support tray. This causes the elongate member 190 to pivot about pin 192 such that the second end of the elongate member is raised from the upper surface of the support tray 58. In the raised position, the second end of the elongate member blocks the bezel door 66 to prevent a second cartridge from being inserted therethrough.

The process of removing the cartridge from the drive is substantially the reverse of the insertion process. To initiate the removal process, the operator presses a button 202 provided of the exterior of the front wall 62. Pressing the button 202 activates the drive motor 80 in the reverse direction. The drive motor 80 drives the main drive gear 90 in the reverse direction to reverse the travel path of the sliding carriage 58 and the cartridge 32. Immediately following the initiation of the removal sequence the travel path is substantially in a lateral direction away from the head 158. During this stage the bezel door 65 is unlocked in the reverse of the locking process described above.

Subsequently, the direction of travel changes and the cartridge is moved endwise toward the bezel door. However, the bezel door only swings inward. Therefore, the bezel door must be opened before the cartridge reaches it. To facilitate opening of the bezel door, an arm 204, illustrated in FIGS. 4 and 5, is pivotably mounted to pin 206 which extends from a block 208 (FIG. 3) attached to the underside of the support tray 58. A follower 210 is mounted to the arm 204 on one side of the pin 206. On the other side of pin 206 the arm extends past the lower portion of a side edge of the bezel door 66. A pin 212 extends from the arm 204 to engage the outside of the bezel door.

The sliding carriage is provided with a double beveled surface 214 which is positioned to slide past the follower 210. As the follower 210 slides along one incline of the double beveled surface 214, the arm 204 pivots upward and inward and pin 212 opens the bezel door 66 (FIG. 5). As the follower 210 slides along the other incline of the double beveled surface 214, the arm 204 returns to the original position. Typically the cartridge 32 will be beneath the bezel door 66 so that the bezel door 66 swings down until it contacts the top cover 36 of the cartridge. The bezel door 66 swings completely closed when the cartridge is removed from the opening 64. The step of opening the bezel door is not necessary during the loading sequence because during loading insertion of the cartridge pushes the bezel door open. However, it should be noted that although the door is already open because the cartridge is inserted therethrough, the action of the arm is the same during insertion of the tape as during removal.

Once the bezel door 66 is open the remainder of the removal sequence is substantially the reverse of the loading sequence. The access door is closed, the retractable indexing block is retracted, and the sliding carriage depresses the switch actuator to deactivate the drive motor 80. Following retraction of the retractable indexing block, spring 118 biases arm 110 to eject the cartridge from the drive through the opening 64 where it may be retrieved by the operator.

An alternative embodiment of the drive mechanism of the present invention is illustrated in FIGS. 22–24. In the alternative embodiment, a spur gear 222 is attached to the output shaft 224 of the drive motor 220. Spur gear 222 drives spur gear 226 at a two-to-one reduction in speed. Spur gear 226, spur gear 228, and worm gear 230 are all fixed to a common shaft 232. Worm gear 230 drives worm gear 234 which rotates about shaft 242 and has spur gear 236 affixed thereto. Spur gear 236 drives the main drive gear 90 which operates substantially as described above.

A bracket 240 mounted to the lower surface of support tray 58 supports shaft 232 and the lower end of shaft 242. The upper end of shaft 242 is received in a recess provided in the lower surface of support tray 58. The support tray 58 is further provided with recesses configured to receive gear 236 and allow rotation of gears 222, 226, and 224.

The drive mechanism illustrated in FIGS. 22–25 is also provided with a mechanism allowing for manual removal of the cartridge from the drive. This feature advantageously allows retrieval of the cartridge from the drive should the motorized drive mechanism be disabled by a power failure or the like. The manual removal mechanism includes a rotatable drive shaft 244 which extends rearward from the front wall 62 through an aperture in the bracket 240 and is generally coaxial with the output shaft 224.

The front end of the drive shaft 244 is received within a button 246 which is received in an aperture 250 provided in the front wall 62. The button 246 is received within aperture 250 in a manner that allows for both rotational and longitudinal movement of the button within the aperture. An enlarged ring 258 is provide on the rear end of the button 246. The enlarged ring is larger than the aperture 250 and thereby prevents the button 246 from passing completely through the aperture 250. The button is further provided with a slot 260 (FIG. 25) which allows the button to be rotated by means of a screwdriver or the like.

A spur gear 248 is affixed to the rear end of the drive shaft 244. Spur gear 248 is provided with a concentric cavity 262, illustrated in phantom.

Spring 252 is mounted coaxially on the drive shaft. One end of spring 252 abuts against bracket 240 and the other against collar 254. The collar 254 is positioned on the drive shaft 244 by stop 256 such that the spring 252 is slightly compressed. In this manner, spring 252 biases the drive shaft 244 toward the front of the drive. Forward movement of the drive shaft 244 is limited by reason of the enlarged ring 258 abutting the front wall 62.

To operate the manual cartridge removal device a screwdriver or the like is inserted into slot 260. Axial pressure is applied to the screwdriver to overcome the force of spring 252 and move the drive shaft 244 longitudinally inward, to an engaged position as illustrated in FIG. 24. In the engaged position, the end of the output shaft 224 is received in cavity 262 and spur gear 248 engages spur gear 228. While in the engaged position, the cartridge can be removed from the drive by twisting the screwdriver to turn the drive shaft 244 and spur gear 248. Spur gear 248 drives spur gear 228 which is fixed to the same shaft 232 as worm gear 230. Worm gear 230 drives spur gear 238 which is fixed to spur gear 236 which drives main drive gear 90 to move the sliding carriage 70 and eject cartridge 32.

In the illustrated embodiment drive shaft 244 drives spur gear 228 with a two to one increase in speed. In this manner, speedy and convenient withdrawal of the cartridge is facilitated because it is necessary to turn the drive shaft only one-fourth the number of turns that the motor must turn. In order to ensure that the drive shaft is rotated in the proper direction, the slot 260 may be configured with two diametrically opposed raised quarters 264 with opposing sides 266 of the quarters 264 having sloped walls. This well known configuration, illustrated in FIG. 25, allows the screwdriver to engage the slot only when it is rotated the appropriate direction.

This detailed description is set forth only for purposes of illustrating an example of the present invention and should not be considered to limit the scope thereof in any way. Clearly numerous additions, substitutions, and other modifications can be made to the invention without departing from the scope thereof. Further, although the illustrated embodiment is designed to use the ANSI X3.55-1977 type cartridge and the illustrated drive is dimensioned to fit within the five and one-quarter inch form factor, the scope of the invention includes drives having a variety of dimensions and designed for use with other types of cartridges. Accordingly, the protection afforded the present invention should be limited only by the scope of the appended claims and equivalents thereof.

What is claimed is:

1. A cartridge tape drive for a rectangular cartridge having an access door along an edge thereof which is openable to allow access to a segment of a magnetic tape within the cartridge, comprising:

a housing having an opening dimensioned to receive the cartridge endwise and containing means for supporting the cartridge within said housing;

a magnetic head within said housing;

means for sensing the presence of at least a portion of the cartridge within said housing at a first position;

means responsive to said sensing means for moving the cartridge from said first position at least partially laterally to a second position in operative engagement with said magnetic head; and means operative with said moving means for opening the access door of the cartridge as the cartridge is moved from said first position to said second position;

wherein the cartridge access door operates by pivoting about an axis substantially perpendicular to a base plate of the cartridge to expose a portion of a magnetic tape within the cartridge; and said access door opening means further comprises means for engaging the access door pivotably about an axis substantially coaxial with the axis of the cartridge access door.

2. A cartridge tape drive of claim 1 wherein:

said housing further dimensioned to fit within a space having a height of no more than three and one-quarter inches and a width of approximately five and three-quarter inches;

said magnetic head further mounted in said housing in a manner which prevents horizontal movement of said head with respect to said housing;

said moving means further comprises;

a carriage mounted within said housing;

means attached to said carriage for gripping the carriage and for restriction motion of the cartridge with respect to said carriage;

means for operatively engaging said carriage for driving said carriage and the cartridge;

wherein further:

said carriage is mounted to the underside of said supporting means and said gripping means extends generally upward from said carriage past said supporting means to grip opposing ends of the cartridge;

said carriage is further provided with at least one post which extends through a slot provided in said supporting means, said post moving within said slot to define a path of travel as the carriage moves; and said opening means further comprises a member which pivots about an axis which is substantially coaxial with the axis of the carriage access door when the carriage is received by said gripping means; and said opening means further comprises a finger member extending from said member wherein said finger member pivots the access door open as said member pivots.

3. A cartridge tape drive for an elongate, rectangular cartridge having an access door along a side edge thereof which operates by pivoting about an axis substantially perpendicular to a base plate of the cartridge to expose a portion of a magnetic tape within the cartridge, comprising:

a housing having an opening dimensioned to receive the cartridge endwise and containing a means for supporting the cartridge within said housing;

a magnetic head mounted in said housing in a manner which prevents horizontal movement of said head with respect to said housing;

means for sensing the presence of at least a portion of the cartridge within said housing at a first position;

means responsive to said sensing means for moving the cartridge from said first position at least partially laterally to a second position in operative engagement with said magnetic head; and means operative with said moving means for opening the access door of the cartridge as the cartridge is moved from said first position to said second position;

wherein said access door opening means further comprises means for engaging the access door pivotably about an axis substantially coaxial with the axis of the cartridge access door.

4. A cartridge tape drive for a rectangular cartridge having an access door along an edge thereof which is operable to allow access to a magnetic tape within the cartridge, comprising:

a housing having an opening dimensioned to receive the cartridge endwise and means for supporting the cartridge within said housing;

a magnetic head in said housing;

means for sensing the presence of at least a portion of the cartridge within said housing at a first position;

means comprises a motor and a first gear driven by said motor responsive to said sensing means for automatically moving the cartridge from said first position at least partially laterally to a second position in operative engagement with said magnetic head;

means operative with said moving means for opening the access door of the cartridge as the cartridge is moved from said first position to said second position; and means comprises a second gear positionable in an engaged position with said first gear and a means for manually rotating said second gear for manually moving the cartridge out of operative arrangement with said magnetic head and withdrawing the cartridge from said housing; and said second gear is further moveable between said engaged position and a disengaged position in which said second gear does not engage said first gear.

5. A cartridge tape drive for a rectangular cartridge having an access door along an edge thereof which is openable to allow access to a segment of a magnetic tape within the cartridge, comprising:

a housing having an opening dimensioned to receive the cartridge endwise and containing means for supporting the cartridge within said housing;

a magnetic head fixed to said housing to prevent lateral movement of said head with respect to said housing;

means for sensing the presence of at least a portion of the cartridge within said housing at a first position;

means responsive to said sensing means for moving the cartridge from said first position in a lateral plane to a second position in operative engagement with said magnetic head;

means operative with said moving means for opening the access door of the cartridge before the cartridge reaches said second position; and means fixed to said housing for positioning said cartridge in said second position so that the relative position between said cartridge and said head is accurately defined; wherein said positioning means engages the cartridge as the cartridge is moved from said first position to said second position when said cartridge is nearly in said second position;

said positioning means further comprises resilient engaging means defining three points and a plane for an accurate and repeatable second position for engaging the cartridge in direction perpendicular to said lateral plane; and said resilient engaging means further comprises a surface fixed to said housing, a ball bearing displaced at a determined distance away from said surface, and a spring resiliently urging said ball bearing toward said surface whereby the cartridge in said second position is resiliently engaged between said surface and said ball bearing.

6. A cartridge tape drive for a rectangular cartridge having an access door along a side thereof which is operable to allow access to a magnetic tape within the cartridge, comprising:

a housing having an opening dimensioned to receive the cartridge endwise and a means for supporting the cartridge within said housing;

a magnetic head fixed to said housing to prevent lateral movement of said head with respect to said housing;

means for sensing the presence of at least a portion of the cartridge within said housing at a first position;

means responsive to said sensing means for automatically moving the cartridge from said first position in a lateral plane to a second position in operative engagement with said magnetic head;

means operative with said moving means for opening the access door of the cartridge before the cartridge reaches said second position;

wherein further said moving means comprises a motor and a first gear driven by said motor;

means for manually moving the cartridge out of operative engagement with said magnetic head and withdrawing the cartridge from said housing;

said manually moving means comprises a second gear positionably in an engaged position with said first gear and a means for manually rotating said second gear; and said second gear is further movable between said engaged position and a disengaged position in which said second gear does not engage said first gear.

7. The cartridge tape drive of claim 6 wherein said manually rotating means further comprises means for rotation only in one direction to move the cartridge out of operative engagement with said magnetic head and to withdrew the cartridge from said housing.

8. The cartridge tape drive of claim 6 wherein said manual rotating means comprises a screw.

9. The cartridge tape drive of claim 8 wherein said screw is capable of engagement with a screw driver only in one direction.

10. A cartridge tape drive for a rectangular cartridge having an access door along a side thereof which is openable to allow access to a magnetic tape within the cartridge, comprising:

a housing having an opening dimensioned to receive the cartridge endwise and a means for supporting the cartridge within said housing;

a magnetic head fixed in said housing to prevent lateral movement of said head with respect to said housing;

means for gripping the cartridge in a first position in said housing;

means operatively coupled to said gripping means for transporting the cartridge from said first position in a lateral plane to a second position in operative engagement with said magnetic head;

means operative with said transporting means for opening the access door of the cartridge before the cartridge reaches said second position; and means fixed to said housing for positioning said cartridge in said second position so that the relative position between said cartridge and said head is accurately defined;

said positioning means further engages the cartridge as the cartridge is moved from said first position to said second position when said cartridge is nearly in said second position;

said position means further comprises means for resiliently engaging the cartridge in a direction perpendicular to said lateral plane;

said resilient engaging means further defines three points and a plane for an accurate and repeatable second position for the cartridge; and said resilient engaging means further comprises a surface fixed to said housing, a ball bearing displays a predetermined distant away from said surface, and a spring resiliently urging said ball bearing toward said surface whereby the cartridge in said second position was resiliently engaged between said surface and said ball bearing.

11. The cartridge tape drive as in claim 10 further comprises means for manually moving the cartridge out of operative engagement with said magnetic head and withdrawing the cartridge from said housing.

12. The cartridge tape drive of claim 11 wherein said manually rotating means further comprises means for rotation only in one direction to move the cartridge out of operative arrangement with said magnetic head and to withdraw the cartridge from said housing.

13. The cartridge tape drive of claim 11 wherein said manually rotating means comprises a screw.

14. The cartridge tape drive of claim 13 wherein said screw is capable of engagement with a screw driver only in one direction.

15. The cartridge tape drive as in claim 10, wherein further:
- said transporting means comprises a motor and a first gear driven by said motor, said manually moving means comprises a second gear positionable in an engaged position with said first gear and a means for manually locating said second gear; and,
- said second gear is moveable between said engaged position and a disengaged position in which said second gear does not engage said first gear.

16. The cartridge tape drive as in claim 10 wherein the cartridge access door operates by pivoting about an axis substantially perpendicular to a base plate of the cartridge to expose a portion of a magnetic tape within the cartridge, and wherein said access door opening means further comprises means for engaging said access door pivotably about an axis substantially coaxial with the axis of the cartridge access door.

17. The cartridge tape drive of claim 16 wherein said opening means further comprises a member which pivots said substantially coaxial axis when the cartridge is received by said gripping means, said opening means further comprises a finger member extending from said member, wherein said finger member pivots the access door open as said member pivots.

18. The cartridge tape drive for an elongate, rectangular cartridge having an access door along a side edge thereof which operates by pivoting about an axis substantially perpendicular to a base plate of the cartridge to expose a portion of a magnetic tape within the cartridge, the cartridge having a length of approximately six inches and a width of approximately four inches with the access door closed and a width of approximately five and three-quarter inches with the access door fully open, said cartridge tape drive comprising:
- a housing dimensioned to fit within a space having a height of no more than three and one-quarter inches and a width of approximately five and three-quarter inches and having a frontal opening dimensioned to receive the cartridge endwise and containing means for supporting the cartridge within said housing;
- a magnetic head mounted in said housing in a manner which prevents horizontal movement of said head with respect to said housing;
- means for sensing the presence of at least a portion of the cartridge within said housing at a first position;
- means responsive to said sensing means for moving the cartridge from said first position at least partially laterally to a second position in operative engagement with said magnetic head; and
- access door opening means comprising means for engaging the access door pivotably about an axis substantially coaxial with the axis of the cartridge across door and operative with said moving means for opening the access door of the cartridge as the cartridge is moved from said first position to said second position.

* * * * *